United States Patent [19]

Brown et al.

[11] Patent Number: 4,925,727

[45] Date of Patent: May 15, 1990

[54] CURABLE TEMPERATURE INDICATING COMPOSITION

[75] Inventors: Andrew V. Brown, San Jose; Tamar G. Gen, Palo Alto; Gary R. Weihe, Fremont, all of Calif.

[73] Assignee: Raychem Corporation, Menlo Park, Calif.

[21] Appl. No.: 403,451

[22] Filed: Jul. 30, 1982

[51] Int. Cl.$^5$ ............................................. C09K 3/00
[52] U.S. Cl. ...................................... 428/199; 116/216
[58] Field of Search ................. 428/199, 195; 116/216

[56] References Cited

U.S. PATENT DOCUMENTS

| | | | |
|---|---|---|---|
| 3,455,336 | 7/1969 | Ellis | 138/156 |
| 3,469,448 | 9/1969 | Swengel, Sr. | 116/216 |
| 3,816,335 | 6/1974 | Evans | 252/408 |
| 3,995,489 | 12/1976 | Smith et al. | 73/339 R |
| 4,052,280 | 10/1977 | McGinnis | 204/159.14 |
| 4,105,583 | 8/1978 | Glover et al. | 252/408 |
| 4,108,001 | 8/1978 | Smith et al. | 73/339 R |
| 4,142,416 | 3/1979 | Smith et al. | 73/339 R |
| 4,233,731 | 11/1980 | Clabburn et al. | 29/859 |
| 4,337,289 | 6/1982 | Reed et al. | 428/195 |
| 4,344,909 | 8/1982 | De Blauwe | 264/230 |
| 4,450,023 | 5/1984 | De Blauwe | 156/64 |

FOREIGN PATENT DOCUMENTS 2077919 6/1980 United Kingdom .
2038478 7/1980 United Kingdom .

OTHER PUBLICATIONS

Hawley, "Condensed Chemical Dictionary", van Wostrand.
Chemical Reviews, vol. 68, No. 6, pp. 649–657, Nov. 25, 1968, Jesse H. Day.

Primary Examiner—Nancy A. B. Swisher
Attorney, Agent, or Firm—A. Stephen Zavell; Herbert G. Burkard

[57] ABSTRACT

A temperature indicating composition is provided for use on a recoverable article so that heating to produce recovery or to activate a heat-activatable sealant can be monitored. The composition comprises a thermochromic colorant in a binder that can be cured by UV radiation. Such a composition can be applied rapidly to polyolefin substrates by printing.

26 Claims, No Drawings

CURABLE TEMPERATURE INDICATING COMPOSITION

BACKGROUND OF THE INVENTION

The present invention relates to a temperature indicating composition that is UV curable, and in particular to a thermochromic, UV curable ink that can be applied to a recoverable substrate by printing.

Temperature indicating compositions have found widespread use where warning of temperature excursion is required or where a heating process is to be monitored. They are of special use where the desired maximum temperature would not otherwise be apparent to the operator; an example of this is in the use of heat-recoverable materials where a certain temperature is required for proper recovery but where a higher temperature could cause damage. Such recoverable materials are commonly used for sealing, the effectiveness of which is enhanced by provision of a heat-activatable sealant, such as a hot-melt adhesive, a reactive epoxy adhesive or a softenable mastic, on a surface of the recoverable article which will contact the substrate to be sealed. This sealant will not be visible to the installer, who therefore needs some indication that the correct bond-line temperature has been reached. The problem has been overcome by applying to a visible surface of the article to be heated a composition, the color of which changes when an internal surface, for example, has reached some desired temperature. Such temperature indication is also applicable to articles which are recovered by means other than heat, but which require heat solely for activation of an adhesive; or which may experience heat during use. Such recoverable articles may be temporarily maintained in their dimensionally unstable configuration by a hold-out member which is removed by dissolving the adhesive bond between the hold-out and the recoverable article or by other means.

A temperature indicating composition which is suitable for use on a recoverable material will contain components that are common to any paint or ink, but they will be chosen and combined with other components to insure suitability for a substrate that will be subjected to a range of temperatures, that changes size or shape, and that should remain environmentally sealing.

The basic components are a colorant, a binder or resin and often a solvent. The colorant of course gives the composition the desired color and in most paints and inks has the characteristic of permanence. The binder, together with solvent where used, wets the pigment and gives the composition tack and the rheological properties appropriate to the method by which the composition is to be applied to its substrate. Once the composition is on the substrate it is set, for example by evaporation of solvent. After application, the binder will be responsible for the final film properties of the paint or ink. In general, the colorant must function as a pigment rather than as a dye for its intended application, by which is meant that it must be opaque, rather than transparent. In order to do this it must have hiding power, and the physical properties which endows a colorant with hiding power are its refractive index and insolubility. Where the colorant alone has not a sufficiently high hiding power, a further component, called an opacifier and generally white, should be added.

The formulation of a paint or ink is related not only to the method by which it is to be applied and to the properties that the final film must possess, but also to the drying method to be used. Many methods of drying are available but only one is used in the heat-shrink art. A brief review will be made of some of the generally applicable methods available for drying inks and paints.

Drying can occur by penetration: the entire composition is absorbed into the substrate. This is of more use for dyes than pigments since a dye is entirely dissolved in its vehicle. It has not been used on heat-shrink products which are generally non-absorbent.

A second method is hardening of a binder by oxidation. This can be slow and may require catalysts to produce an acceptable rate.

The most important method of drying is by solvent evaporation, and this is the technique used for paints that have been used on recoverable products. The paint comprises a pigment suspended in a resin-solvent system, and after application the solvent is removed causing the resin to revert to a solid. This system is applicable both to paints and to the three major printing techniques: typographic, planographic, and intaglio. The rate of drying can easily be controlled: it is increased by heat, and with heat can be very rapid. Many resin-solvent systems have been developed which satisfy all the requirements as regards, odor, toxicity, color, solvent power, rate of evaporation, boiling range, combustibility and viscosity. The system is highly versatile allowing application by a variety of methods to a variety of substrates.

Polymerization of a binder can also cause the desired change from liquid to solid. A common example of this is urea formaldehyde or melamine-formaldehyde resins emulsified in a solvent such as water. Heat drives off the water, resulting in polymerization. Newer techniques involve initiating a polymerization reaction by means of infra red radiation, microwaves, dielectric, electron beams or ultra-violet radiation.

The final technique to be mentioned here is drying by means of precipitation. The vehicle in which the colorant is carried is a solvent plus binder, and a further substance is added selectively to precipitate one but not the other.

Some of the systems that have been used for temperature indicating compositions will now be reviewed.

In U.S. Pat. Nos. 4,142,416, 4,108,001 and 3,995,489 to Smith, compositions are used to detect overheating in electrical apparatus. A current of air is passed through the apparatus to cool it, and parts of the apparatus that are cooled by the current of air are coated with an organic composition which decomposes and thermoparticulates. If overheating occurs, particles of the decomposed composition will be detected downstream of the apparatus. The specification is not concerned with themochromism, but it mentions that the organic compounds used char when heated.

U.S. Pat. No. 3,816,335 discloses incorporation of an inorganic thermochromic colorant throughout the body of a heat-recoverable plastic article. A problem that can occur with some inorganic systems is a tendency for the base polymer to become degraded under the action of the colorant and heat. This problem was solved in U.S. Pat. No. 4,105,583 where it was proposed that zinc borate and zinc sulfide should be added to some inorganic systems. Other active ingredients were also mentioned. The disclosures of this patent and of U.S. Pat. No. 3,816,335 are incorporated herein by reference. In U.S. Pat. No. 4,344,909, a move was made away from inorganic colorants to the use of organic materials that melt and decompose at the desired temperature, thus causing a color change. In this case the thermochromic ingredient is applied in an aqueous or other vehicle, or as part of a solid formulation such as a wax. The disclosure of this publication is incorporated herein by reference.

This use of organic materials on recoverable articles can be improved by selection of the binder so that decomposition products of the thermochromic colorant were trapped thereby insuring irreversibility. This is disclosed in U.S. Pat. No. 4,450,023, the disclosure of which is incorporated herein by reference.

The majority of these compositions comprise a pigment, an opacifier, a binder and a solvent. They thus rely, like many paints and inks, on evaporation of a solvent. These compositions have no toxicity problem and they can provide a sharp color change at the desired temperature. Under certain rather exacting circumstances, however, they can have some drawbacks. In particular, solvent removal requires energy, and if the solvent evaporated is not re-circulated, a further expense is incurred. Drying times, although short, are often rate-limiting steps in the manufacture of recoverable coated material. A solvent system often results in a thick, sometimes rather dusty, coating of the temperature indicating composition. When a heat-shrink article is recovered by torch any thick areas of coating can concentrate the heat causing hot-spots and cratering of the surface of the article. This is likely to be a problem only with unskilled hands in unfavorable conditions where a hot flame is required; nonetheless it could be regarded as an area of craft-sensitivity which is desirable to reduce.

What we have now designed is a temperature indicating composition which can be applied to a recoverable substrate extremely rapidly by printing to produce a very thin coating having sufficient hiding power which will maintain its adhesion during the conformational change that occurs on recovery.

SUMMARY OF THE INVENTION

The present invention thus provides an article, which comprises:

a recoverable substrate having on a surface thereof a temperature indicating composition applied as:
(a) a UV curable binder which on curing is capable of adhering to the substrate;
(b) a colorant which produces in the composition a substantial color change when the composition is heated; and
(c) an initiator which on exposure to UV radiation initiates a polymerization reaction in the binder.

The binder ordinarily will contain a reactive oligomer which polymerizes when initiated by the action of UV radiation on the initiator or by other means. The reactive oligomer is the primary, and may be the sole, component of the binder and is thus responsible for the bulk of the performance properties of the binder, and thus of the complete composition. The binder may, however, also contain a reactive diluent which will in general comprise one or more monofunctional and multifunctional monomers; the function of this component is to act as a non-evaporating solvent and to provide further cross-linking sites.

The recoverable article may be a recoverable polymeric material or a memory metal such as a beta brass or a nickel-titanium alloy. In particular, the recoverable article may be a wrap-around or tubular sleeve, or other hollow article, having a heat activatable adhesive on an inner surface.

Of all the drying techniques available, the use of UV curing gives to the composition particular advantages. A correct choice of binder, colorant, initiator and optional additives allows a composition to be produced which is suitable on articles such as polyolefins and other plastics.

The following description will examine the several requirements of such a composition, outline the chemistry of the major components and finally give examples of preferred formulations. In the light of this the chemist skilled in the arts of thermochromism, UV curing, and printing will be able to select a formulation which fulfills his requirements.

The first quality of paint or ink is its color, and in the case of temperature indicating paint or ink, color above and below the transition temperature must be considered. The color must be chosen bearing in mind the color of the substrate to which it is to be applied, and the conditions under which it is to be viewed. Recoverable articles for encapsulation are often black and in dark manholes or above ground and viewed silhouetted against the sky where they may be difficult to see. In either case a bright colored composition is desirable. Where the substrate is black the composition must have good hiding power, either before or after the color change, and any deficiency here can be made good by the addition of an opacifier such as titanium dioxide, the higher refractive index allotrope, rutile, being preferred. If the thermochromic colorant has ideal properties except for its color, this can be modified by adding a tinting agent.

The color change is preferably quick and irreversible. Where the color change is irreversible the composition will act as a permanent record of the temperature to which the substrate was subjected so that inspection can be made sometime after the heating occured.

The composition must adhere well to the substrate, so the chemical nature of the substrate and the adequacy of any surface cleaning being undertaken must be considered. In the context of recoverable plastics, adherence is regarded as satisfactory if the composition is not removed by adhesive tape pulled from a surface that has previously been scored with a blade. Adhesion is a tougher requirement in the case of a recoverable material than a dimensionally stable material since the conformational change may lead to cracking or peeling. Furthermore, it is desirable that the coating can retain its integrity under those conditions which the recoverable material itself is expected to be able to endure. The recoverable material may be tested for elongation, pressure or temperature cycling and flexing, etc., and proper adhesion of the composition is preferably maintained throughout such tests. In addition to remaining adhered, it is clearly necessary that the composition does not impair the performance of the substrate to such an extent that it no longer passes the tests by which it will be judged.

The technique used and the conditions under which the composition is applied to the substrate will also affect the choice of components of the composition. The following can be regarded as desirable features of the composition before coating:
1. Ready availability
2. Viscosity suitable for printing 3. Long shelf life and no activation by normal incandescent lighting
4. Low volatility and flammability
5. Good hiding power for very thin layers
6. Fast cure rate
7. No ancillary component to be recycled
8. Heat not required for satisfactory cure rate The UV system of curing allows a composition to be produced which is particularly valuable in each of these respects. In particular, very high cure rates can be obtained which, together with a printing technique, allows material to be coated with the composition extremely rapidly. The coating can be applied very thin, if printed, and formulations can be prepared which give sufficient hiding power at a thickness of 1 micron or less. Where the colorant itself lacks sufficient hiding power and it is undesirable to add normal opacifying agents because of their modifying influence on the final temperature converted color, it has been discovered that the components of the binder itself can be chosen to act as an opacifier on curing. Thin coatings have the advantages of a satisfying appearance, prevention of cratering when flame treated, and a reduction in the quantity of composition that has to be manufactured, stored, processed, and used. A UV curable system need not, and generally will not, involve any solvent; this avoids the energy required for vaporization and avoids any costly re-cycling apparatus. The fact that no thermal energy is required is of particular use in conjunction with an irreversible thermochromic colorant and with an essentially irreversible recoverable substrate. If excessive heat had to be applied to adhere the composition to the substrate the resulting product would of course be quite useless.

The following remarks on the chemistry of the components of the composition show how these objectives can be achieved. The binder will be discussed first.

The basis of the binder is a reactive oligomer or prepolymer which polymerizes when subjected to UV radiation in the presence of a suitable initiator. A second component of the binder is a reactive diluent which modifies the cure rate and, for example, the viscosity of the uncured composition. The principal properties of the final cured resin, however, are generally imparted by the reactive oligomer component. The reactive oligomer preferably constitutes about 30-80% by weight of the composition. The binder must be capable of adhering to the substrate on curing, but it may of course also wet or adhere to the substrate before curing.

Reactive oligomers or prepolymers are customarily used in conjunction with free monomeric and polyfunctional compounds. The functions of added monomers are to modify the properties of the final cured resin and to reduce the viscosity of the oligomer which ordinarily would be too high for conventional application techniques without these "reactive diluents." Even when reactive diluents are used, it is often difficult with filled systems, such as compositions containing thermochromic pigments, to achieve the low viscosity or rheological properties needed for the chosen printing or other coating technique. The "reactive diluent" may comprise from 5-80, preferably from 45-65%, by weight of the UV curable binder.

Four broadly defined classes of binder oligomers will be mentioned: epoxides; unsaturated polyesters; acrylated resins such as acrylated epoxides, acrylated polyesters, acrylated polyethers, acrylated polyurethanes; and polyene/thiols.

An example of the first group is the cycloaliphatic diepoxide, ERL 4299 available from Union Carbide. This product will give excellent adhesion to polyethylene and other plastics substrates. The chain length between the two functional groups can be altered to vary the flexibility of the final film, for example, by selecting alternative diepoxides. If need be, flexibility can be further improved by incorporating an extender such as polyethylene glycol, a molecular weight of about 400 being recommended. An alternative epoxide is that manufactured by Ciba Geigy under the designation CY179. They can be produced by alkaline condensation of epichlorohydrin and a dihydric phenol.

The preferred group of binders is the acrylated resins, which can give high cure rates. Polymerization can be carried out in a solvent and the resin/solvent system applied to the substrate, followed by evaporation of the solvent. What is preferred, however, is to initiate polymerization after the composition is applied, thereby dispensing with the solvent. Since these resins contain vinyl groups, polymerization is initiated by free radicals. Some free radical polymerizations are inhibited by oxygen, and may thus require provision of an inert atmosphere. Initiators required can easily be formulated free of other undesirable elements, such as fluorine, which is present in many cationic initiators and which is considered undesirable in some environments.

Acrylated oligomers sometimes are low molecular weight acrylic polymers which contain residual unsaturated acrylate or methacrylate functionality. Usually, however, the term "acrylated oligomer" applies to low MW polymers of several sorts which are terminated by unsaturated acrylic or methacrylic ester groups. These base polymers commonly are in the class of polyester, ether, urethanes, and epoxides, or combinations of these, but for ease of discussion they may merely be referred to as reactive or unsaturated acrylates, polyesters, urethanes, epoxides, etc. It should be understood that the only active functionality in these resins is that of the terminal acrylate or methacrylate groups in most cases. Seven broad classes are listed below, together with some examples.

| | |
|---|---|
| 1. Acrylated acrylics (Celanese Corp.) | Celrad 1700 |
| 2. Acrylated esters | |
| 3. Acrylated urethanes | Uvithane 893 also Uvithanes 782, 783 and 788 (Thiokol Corp) |
| 4. Acrylated epoxides | Epocryl 370 (Shell Chemical Co.) Celrad 3200 (Celanese Corp.) |
| 5. Acrylated ether-urethanes | Purelast 186 (Polymer Systems Corp.) |
| 6. Acrylated amide | |
| 7. Acrylated carbonate | |

Mono-functional as well as these multi-functional products can be produced. A multi-functional product, such as a difunctional product, will be used to produce a cross-linked resin.

In addition to the series of acrylates, a corresponding series of methacrylates exist. In general, the methacrylates are harder than the corresponding acrylates due to a more rigid molecular structure, and this may result in a reduction in flexibility. Acrylates will in general cure faster than the corresponding methacrylates.

Acrylated urethanes can be produced by reacting hydroxy-containing acrylates with isocyanates. Diisocyanates would produce urethane diacrylates. When these compounds are used as the oligomeric or prepolymeric sole component of the binder, they usually have too high a viscosity. As mentioned above, this can be overcome by adding a reactive diluent. Acrylated urethanes, for example, will be chosen where good flexibility and abrasion resistance is desired. Where the molecular chain is thus extended the acrylated urethane behaves more like a urethane and less like an acrylate.

Acrylated epoxides will be similar to acrylated esters, but they are classified in this way due to the method by which they have been prepared. They are usually derived from epoxy ring opening by acrylic acid.

The binder may also comprise a mercaptan/olefin system which reacts by free radical addition of mercaptan to an olefin. Olefins have a tendency to homopolymerize so the conditions must be chosen to insure that the rate of hydrogen transfer from mercaptan is faster than the homopolymerization rate.

The reactive diluent preferably used in conjunction with the reactive oligomer may be either monofunctional or multifunctional monomers or combinations thereof. Both are used for viscosity adjustment and act as nonvolatile solvents. Where reduced viscosity is the primary consideration, monofunctional diluting monomers may be used, and where high curing rates and a highly cross-linked product are desired, diluting monomers of higher functionality should be added. Materials suitable as the reactive monomers include monoacrylates, diacrylates, triacrylates, corresponding methacrylates, vinyl ethers, vinyl esters, vinyl acrylates and unsaturated acids and their corresponding anhydrides. Some examples are given below:
isobornyl acrylate
ethylhexyl acrylate
trimethylpropyl triacrylate
butyl acrylate
tetrahydrofurfuryl acrylate
trihydroxypropyl methacrylate
ethoxyethoxyethyl acrylate
hydroxypropyl methacrylate
hexanediol diacrylate
polyethylene glycol diacrylate
polyethylene glycol dimethacrylate
propylene glycol acrylate
triethylene glycol diacrylate
ethoxyethyl acrylate
pentaerythritol acrylate
phenoxyethyl acrylate
hydroxypropyl acrylate
pentaerythritol triacrylate
pentaerythritol tetracrylate
vinyl ester of versatic 10 acid
N-vinyl pyrrolidone
styrene
vinyl toluene
itaconic acid
maleic anhydride The initiator required in the temperature indicating composition can be any of many well known compounds and it preferably is present in an amount equal to about 2-7% by weight of the binder. The initiator will be chosen according to whether ionic (almost invariably cationic) or free radical polymerization is appropriate. Free radical polymerization is generally preferred since a greater variety of reactive materials are available, cure rates are generally faster, use of a wider range of pigments is possible, and cure whitening, to be discussed below, can occur. A disadvantage however is oxygen inhibition. The types of initiator available can be classified in terms of mechanism or in terms of chemical type (especially acyloins, aromatic carbonyls and polyhalogenated compounds). For free radical polymerization, benzoin alkyl ethers, which work by homolytic fission, are preferred. Examples include Darocur 1173 (EM Chemicals) and Irgacure 184 (Ciba-Geigy), which are 2-hydroxy-2-methyl-1-phenyl propanone and 1-hydroxy-cyclohexyl phenyl ketone, respectively. An example of an aromatic carbonyl which works by hydrogen abstraction or electron transfer is benzophenone.

The preferred initiator for cationic polymerization is a 3M product designated FC508, which is a proprietary product believed to be a triarylsulfonium hexafluorophosphate salt.

In either case the preferred amount of initiator is from 1-10%, more preferably from about 2-8% by weight, based on the total weight of the composition.

The thermochromic colorant is at the heart of the system, and all the other components are present in order that the colorant may be applied to a substrate quickly, cheaply and permanently.

The first consideration when choosing a colorant is the temperature of the color change and whether or not the change is reversible. Secondly, it must be able in the composition to provide the desired hiding power. Thirdly, it must be compatible with a binder system already chosen, or it must not put undue restraints on the choice of a binder system. Fourthly, it must not adversely affect the substrate to which it is applied.

The colorant can have an effect on the efficiency of the UV cure, on rheological properties, on storage stability and on the surface or gloss of the final film. If the pigment absorbs or scatters radiation of the wavelength that activates the initiator, then efficiency of the initiator will be reduced. If the colorant becomes involved chemically in the initiator reaction it may thereby deactivate the initiator.

Both organic and inorganic compounds can be used as thermochromic colorants, and attention is directed to the prior art patents referred to above which discuss suitable compounds. Also discussed is a way of overcoming the deleterious effects of some inorganic colorants by the addition of zinc borate and zinc sulfide.

The color change of an inorganic thermochromic material can result from decomposition of the molecule, which is preferred because it is irreversible, from a change in crystalline phase, ligand geometry or number of molecules of solvent in a co-ordination sphere. Also, colorant change can result from an alternation in the equilibrium between various complexes in solution.

Where the thermochromic colorant is organic, a change in equilibrium between the following species can be responsible for the color change:
Acid - base
Keto - enol
Lactone - lactam
Stereoisomers
Crystal structures For further information on the chemistry of color change, the reader is referred to J. H. Day, Chem Reviews 1968 pp. 649 and 1963 pp 65, the disclosures of which are incorporated herein by reference.

Since hiding power is of importance, especially where the substrate to be coated is black, the colorant will generally be a solid material until decomposed. In very general terms, the color changes that can be expected are:
White to black or brown
Yellow to black or brown
Blue to black
Green to black or brown
Red to black
Orange to Red
Yellow to Orange
Green to yellow to orange.

Many thermochromic colorants, although often described as pigments, have poor hiding power and must be used in high concentration, often with an opacifier such as titanium dioxide, applied in thick layers. Thick layers have to be applied by brush, spray or by dipping which can involve a lot of waste. A large amount of an opacifer is undesirable, not only because it leads to higher viscosity, but also because it lessens the color change. By employing one of the UV curable binder of this invention it is possible to produce a temperature indicating composition having sufficient hiding power at a thickness of 1 micron or less, even when pigments of poor hiding power are used, rather than the more usual 0.025 to 0.1 mm. The reason that this can be done by the present invention is that certain of the UV curable binders that we have discovered can themselves act as an opacifier if desired, giving the enhanced opacity necessary for thin film coatings having good hiding power. Although we do not wish to be limited by any theory, the way in which the binder achieves this is believed to be by forming, on curing, at least two microdispersed substantial homopolymeric phases. They are able to do this in preferred embodiments due to the presence of two polymerizable components: the reactive oligomer, which preferably has acrylic ester end group functionality, and the diluting monomer which preferably is a vinyl ester. The reactivity between acrylic esters and vinyl esters during free radical initiated polymerizations is unfavorable. The unfavorable reactivity ratio (a well defined term between these two polymerizable constituents in the science of copolymerization kinetics) leads to the formation of two incompatible homopolymer systems and subsequently to microphase separation, which is manifested by a whitened appearance. The resulting cured product has higher opacity and can thus give the colorant the desired extra hiding power. In designing a formulation, therefore, one can choose the colorant for its temperature change and color change, decide what is the maximum permissible thickness of final film, and then choose a combination of binder components with reference to reactivity ratios to give the correct hiding power. (Some colorants do not, of course, require this additional hiding power, in which case one has more freedom in the choice of binder.) It has been found, moreover, that the opacity produced in the binder in this way increases with increasing cure rate, and it is thus possible to choose precisely the appearance of the final cured ink. This phenomenon was quite unexpected and is not fully understood at this time, being in fact contrary to normal theoretical predictions.

Tables 1 and 2 below show respectively preferred pigments, and other pigments which although not preferred, are suitable. The color before-after the thermochromic color change and the approximate temperature of the change are given.

TABLE 1

| Colorant | Temperature of change | Color |
| --- | --- | --- |
| Lysine | 245° C. | White-Brown |
| Allantoin | 250° C. | White-Black |
| Folic Acid | 255° C. | Yellow-Black |
| Arginine | 255° C. | White-Brown |
| Glycine | 260° C. | White-Black |
| Barium Lithol Red | 265° C. | Red-Black |
| Basic Copper Carbonate | 270° C. | Green-Brown |
| Thiamine | 270° C. | White-Black |
| $Fe_2O_3$ | 275° C. | Yellow-Brown |
| Creatine | 300° C. | White-Black |

TABLE 2

| Colorant | Color Change | | Temperature |
| --- | --- | --- | --- |
| Cobalt Carbonate | Blue | Black | 250° C. |
| Dalamar Yellow | Yellow | Black | 250° C. |
| Calcium Pantothenate USP (American Roland Corp.) | White | Yellow | 230° C. |
| P-(Phenylazo) Meleanilic Acid (Aldrich) | Yellow | Black | 230° C. |
| Thermopaint #22 | White | Grey | 230° C. |
| Cobalt Ammonium Phosphate (Shepard) | Purple | Blue | 230–240° C. |
| Oleo Carrot (Stange) | Orange | Black | 230–300° C. |
| Copper Thiodipropionate | Turquiose | Brown | 235° C. |
| Phenolphthalein Disulfate Dipotassium Salt (Aldrich) | White | Purple | 240–250° C. |
| Thermocolor 2830/6 (Telatemp) | Green | Brown | 240–265° C. |
| Copper Carbonate (Shepard) | Green | Black | 245° C. |
| Temp-Alarm Paint 17E (Big Three Ind.) | Light Green | Brown | 245° C. |
| Azodicarbonamide (Aldrich) | Pale Yellow | White | 250° C. |
| Bromocresol Purple (Aldrich) | Grey | Dark Red | 250–255° C. |
| Atlasol Spirit Orange 2GK (Atlantic Chem) | Orange | Black | 250–260° C. |
| Antimony (V) Sulfide (Alfa) | Orange | Black | 250–270° C. |
| Victoria Blue BX Powder (Dye Specialties) | Blue | Black | 250–270° C. |
| Bromocresol Green H2O Soluble (Aldrich) | Brown | Black | 255° C. |
| Temp-Alarm Paint 126A (Big Three Ind.) | Green | Black | 255° C. |
| 5-Amino-4-Phenylazo-3-Pyrazolol (Aldrich) | Orange | Black | 255–260° C. |
| Hydrindantin Dihydrate | White | Brown | 255–265° C. |

TABLE 2-continued

| Colorant | Color Change | | Temperature |
|---|---|---|---|
| (ICN Pharm.) | | | |
| Temp-Alarm Paint (Big Three (Ind.) | Rust-Brown | Brown | 255–265° C. |
| C.P. Paratoner Deep (Ciba Geigy) | Red | Black | 260° C. |
| C.P. Paratoner Medium (Ciba Geigy) | Red | Black | 260–270° C. |
| C.P. Paratoner X-Light (Ciba Geigy) | Red | Black | 260–270° C. |
| Sodium Pyruvate (ICM Pharm.) | White | Yellow | 260–280° C. |
| Turmeric 50 M. Ster. (Stange) | Orange-Yellow | Black | 260–300° C. |
| Victoria Blue B (Aldrich) | Brown | Black | 270° C. |
| Milling Blue FFR Crude (Atlantic Chem.) | Scarlet | Black | 270–280° C. |
| Beet Powder (Stange) | Orange-Brown | Black | 270–290° C. |
| 2,3-Pyrazine Dicarboxamide (Aldrich) | White | Brown | 275° C. |
| Temp-Alarm Paint 44B (Big Three Ind.) | Blue | Grey-Green | 275° C. |
| Toluidine Yellow 10G (Dupont) | Yellow | Black | 275–285° C. |
| Temp-Alarm Paint 41A (Big Three Ind.) | Blue | Black | 275–305° C. |
| Toluidine Red D (Cyanamide) | Red | Black | 280° C. |
| Bromothymol Blue (MCB) | Dark Green | Black | 285° C. |
| Succinamide (Aldrich) | White | Light Brown | 285–295° C. |
| Tempilaq 550° F. (Temil Corp.) | White | Brown | 285–295° C. |
| Thermopaint 25 | Light Blue | Reddish-Brown | 285–295° C. |
| Amylose (Aldrich) | White | Brown | 290° C. |
| Citrus Bioflavonoid Complex (American Roland Corp.) | Brown | Black | 290° C. |
| Bay Ferrox Yellow 930 (Mobay) | Yellow-Brown | Brown | 290° C. |
| Hansa Red 3B (Amer. Hoechst) | Red | Black | 290° C. |
| Toluidine Red D 20-3920 (Cyanamid) | Red | Black | 290° C. |

A selection of these colorants was tested on a heat-recoverable wraparound sleeve. The sleeve had a rail-like protuberance running adjacent one longitudinal edge, and one spaced slightly from the other longitudinal edge to define a flap which underlies the two rails when they are brought together in the wrap-around configuration. The two rails are held together by a channel which is slid over them. This general type of arrangement is disclosed in U.S. Pat. No. 3,455,336, the disclosure of which is incorporated herein by reference. The internal surface of the sleeve was coated with a hot-melt adhesive and the external surface coated with a temperature-indicating composition of this invention, applied to a thickness of about 1 micron using a gravure printing technique. The sleeve was then recovered by heating with a propane torch. The following colorants changed in color at the web and flap temperatures shown in Table 3.

TABLE 3

| Colorant | Web | Flap |
|---|---|---|
| (a) Cobalt Carbonate | 155° C. | 82° C. |
| (b) Dalamar Yellow | 170° C. | 98° C. |
| (c) Allantoin | 157° C. | 90° C. |
| (d) Fe$_2$O$_3$ | 175° C. | 101° C. |
| (e) Folic Acid | 185° C. | 89° C. |
| (f) Basic Copper Carbonate | 188° C. | 99° C. |

The major optional components of the composition are as follows:
1. Surfactants such as FC-171 a fluorocarbon surfactant (3M)
2. Thickening agent such as Aerosil R972 a hydrophobic silicon
3. Color tinting agents such as phthalocyanine green BF
4. Opacifiers, such as titanium dioxide
5. Sensitizers to improve activity of the initiator such as FC-510 (3M)
6. Stabilizers or deactivators, such as zinc sulfide or zinc borate.

Where these components are used, the following quantities are preferred:

| Surfactant | 0.5–1.5% wt. |
|---|---|
| Thickening agent | 0–10% wt. |
| Color tint | 0–5% wt. |
| Opacifier | 0–3% wt. |
| Sensitizer | 0–8% |
| Deactivator | 0–10% |

EXAMPLES

The invention is now further illustrated by the following formulations given by way of example, which were applied to a recoverable polymeric material and heated. The percentages given are percentages by weight.

EXAMPLE 1

| ERL-4299 Epoxy Resin, cycloaliphatic diepoxide Union Carbide | 55.10% |
|---|---|
| Carbowax 400 (PEG 400) Polyethylene glycol Union Carbide | 24.80% |
| FC 508 Cationic Photoinitiator 3M | 4.00% |
| FC-171 Surfactant 3M | 0.50 |
| Dalamar Yellow Thermochromic colorant DuPont Chemicals | 15.00% |
| Monastral Blue Tinting agent DuPont Chemicals | 0.15% |

| | |
|---|---|
| Rutile | 0.45% |
| Titanium dioxide | |
| Opacifier | |

The ink had a good appearance and good adhesion to cross-linked polyolefin substrates with a suitably low viscosity of 4000 cps. It produced a flexible tough coating on recoverable polymeric substrates.

EXAMPLE 2

The following formulation was prepared:

| | |
|---|---|
| ERL-4299 | 50.2% |
| FC-508 | 4.0% |
| FC-171 | 0.5% |
| PEG-400 | 22.7% |
| FC-510 Photosensitizer | 1.0% |
| Dalamar Yellow | 20.0% |
| Rutile | 0.6% |
| Aerosil Degussa R972 Thickening Agent | 1.0% |

This produced a satisfactory ink with a higher viscosity of 7420 cps. The higher proportion of Dalamar Yellow, which is a very finely ground colorant, and the use of 1% of a thickening agent produced in the higher viscosity.

EXAMPLE 3

The following formulation was prepared:

| | |
|---|---|
| ERL-4299 | 46.4% |
| FC-508 | 4.0% |
| FC-510 | 1.0% |
| FC-171 | 0.5% |
| Polyethylene Glycol 400 | 21.6% |
| Theophylline (Thermochromic colorant) | 15.0% |
| Dalamar Yellow | 10.0% |
| Rutile | 0.4% |
| Cab-O-Sil (Thickener) | 1.1% |

A satisfactory product was obtained.

EXAMPLE 4

The following binder system was prepared:

| | |
|---|---|
| CY-179 Cycloaliphatic epoxy Ciba Geigy | 89.5% |
| FC-507 | 10% |
| FC-430 | 0.5% |

This binder showed excellent adhesion to cross-linked polyolefins.

EXAMPLE 5

The following binder system was prepared:

| | |
|---|---|
| Epocryl 370 Acrylated epoxy, Shell Chemical Co. | 62.3% |
| Ethyl hexyl acrylate | 33.7% |
| EM Chemicals Darocur 1173, Free Radical Photoinitiator | 4.0% |

The binder was satisfactory, although rather brittle for some applications. Adhesion to plastics was not regarded as good, and would be less useful on plastics with high recovery ratios.

EXAMPLE 6

A binder having the following composition was produced:

| | |
|---|---|
| Epocryl 370 | 32.5% |
| Polyethylene glycol dimethacrylate (200) | 63.5% |
| Darocur 1173 | 4.0% |

This product had fair strength, good adhesion and good flexibility. It showed some brittleness but can be regarded as a satisfactory formulation.

EXAMPLE 7

The following binder system was prepared:

| | |
|---|---|
| Uvithane 893 An acrylated urethane, Thiokol | 43.8% |
| Ethoxyethyl acrylate | 47.4% |
| Darocur 1173 | 8.8% |

The result was a highly flexible coating, allowing considerable elongation, reasonable strength, and excellent adhesion to polyolefins.

EXAMPLE 8

The following binder system was prepared:

| | |
|---|---|
| Epocryl 370 | 5.32% |
| Uvithane 893 | 23.24% |
| Propylene glycol monoacrylate | 68.10% |
| Darocur 1173 | 3.34% |

This composition showed excellent strength, excellent adhesion and good flexibility. Before curing it showed low viscosity.

EXAMPLE 9

Viscosity measurments were made on the following binder compositions. Since there was no intention to cure the compositions, no initiator was added. It is not expected that the small amount of initiator normally required would alter the viscosities sufficiently to invalidate the comparison. Measurements were made at room temperature.

| | |
|---|---|
| Uvithane 893 | 33.4% |
| Dicyclopentenyloxyethyl Acrylate | 66.6% |
| | Viscosity = 4600 cps |
| Uvithane 893 | 33.2% |
| Phenoxyethyl acrylate | 66.8% |
| | Viscosity = 2000 cps |
| Uvithane 893 | 33.5% |
| 1,6-Hexanediol diacrylate | 16.5% |
| Phenoxyethyl acrylate | 50.0% |
| | Viscosity = 1400 cps |
| Uvithane 893 | 22.2% |
| 1,6-Hexanediol diacrylate | 11.0% |
| Phenoxyethyl acrylate | 33.4% |
| Dicyclopentenyloxyethyl Acrylate | 33.4% |
| | Viscosity = 800 cps |

EXAMPLE 10

The following temperature indicating composition was prepared:

| | |
|---|---|
| VV10 Vinyl ester of versatic 10 acid Shell Chemical Co. | 39.8% |
| Celrad 3200 acrylated aromatic/aliphatic epoxy blend Celanese Corp. | 32.5% |
| Irgacure 184 free radical photoinitiator Ciba Geigy | 4.6% |
| Folic acid thermochromic colorant | 13.8% |
| Rutile | 0.8% |
| Phthalocyanine Green BS BASF | 0.5% |
| Ganex V-216 a poly(vinylpyrrolidone) surfactant GAF Corp. | 0.8% |
| Aerosil R972 amorphous silica thickener Degussa | 7.2% |

This composition exhibits cure whitening and has excellent hiding power and contrast at coatings as thin as 1.0 micron. The coatings produced were tough and flexible and adhered well to polyolefins.

EXAMPLE 11

The following temperature indicating composition was prepared:

| | |
|---|---|
| VV10 | 38.3% |
| Celrad 3200 | 31.7% |
| Irgacure 184 | 5.0% |
| Basic Copper Carbonate | 12.0% |
| ZnS | 6.0% |
| $ZnB_2O_3$ | 6.0% |
| $TiO_2$ | 0.5% |
| Phthalocyanine Green BS | 0.5% |

A satisfactory product was obtained.

EXAMPLE 12

The following temperature indicating composition was prepared:

| | |
|---|---|
| VV10 | 38.8% |
| Celrad 3200 | 31.2% |
| Irgacure 184 | 5.0% |
| Allantoin | 23.0% |
| $TiO_2$ | 1.5% |
| Phthalocyanin Green BS | 0.5% |

A satisfactory product was obtained.

EXAMPLE 13

The following binder system was prepared:

| | |
|---|---|
| Epocryl 370 | 31.6% |
| Polyethylene glycol dimethacrylate (600) | 64.8% |
| Darocur 1173 | 3.6% |

The product had fair strength, good flexibility and elongation and satisfactory adhesion to cross-linked polyolefins.

EXAMPLE 14

The following binder system was prepared:

| | |
|---|---|
| Uvithane 893 | 61.4% |
| Hexanediol diacrylate | 23.2% |
| Propylene glycol monoacrylate | 11.3% |
| Darocur 1173 | 4.1% |

The product cured well, had good flexibility and good adhesion to cross-linked polyolefins.

EXAMPLE 15

The following binder system was prepared:

| | |
|---|---|
| Uvithane 893 | 43.1% |
| Propylene glycol monoacrylate | 43.4% |
| Ethoxyethyl acrylate | 10.3% |
| Darocur 1173 | 3.2% |

The product was very flexible, had good elongation and strength and excellent adhesion to cross-linked polyolefins.

EXAMPLE 16

The following binder system was prepared:

| | |
|---|---|
| Uvithane 893 | 27.5% |
| Dicyclopentenyloxyethyl acrylate | 68.6% |
| Darocur 1173 | 3.7% |

The product showed excellent adhesion to cross-linked polyolefins.

EXAMPLE 17

The following binder system was prepared:

| | |
|---|---|
| Uvithane 893 | 32.4% |
| Phenoxyethyl acrylate | 64.8% |
| Darocur 1173 | 2.8% |

The product was highly flexible, showed strong surface cure in film form and excellent adhesion to cross-linked polyolefins.

EXAMPLE 18

The following binder system was prepared:

| | |
|---|---|
| Uvithane 893 | 20% |
| Hexanediol diacrylate | 6% |
| Dicyclopentenyloxyethyl acrylate | 71% |
| Darocur 1173 | 3% |

The product was strong and flexible, and adhered well to cross-linked polyolefins.

What is claimed is:

1. An article, which comprises:
    a recoverable substrate having on a surface thereof a temperature indicating composition applied as:
    (a) a UV curable binder which on curing is capable of adhering to the substrate;
    (b) a colorant which produces in the composition a substantial color change when the composition is heated; and
    (c) an initiator which on exposure to UV radiation initiates a polymerization reaction in the binder.

2. An article according to claim 1, in which the substrate is a memory metal.

3. An article according to claim 1, in which the substrate is a recoverable plastic material.

4. An article according to claim 3, in which the substate is a heat recoverable plastic material.

5. An article according to claim 3 or 4, in which the substrate is hollow.

6. An article according to claim 5 in which the substrate is a sleeve.

7. An article according to claim 6, in which the temperature indicating composition is on an outer surface of the sleeve.

8. An article according to claim 7, in which the sleeve has on an inner surface a heat-activatable sealant.

9. An article according to claim 8, in which the sealant is a hot-melt adhesive.

10. An article according to claim 1, in which the binder comprises among other things an acrylated resin oligomer.

11. An article according to claim 10, in which the acrylated resin oligomer is an acrylated aromatic/aliphalic epoxy blend.

12. An article according to claim 10, in which the acrylated resin oligomer is an acrylated urethane.

13. An article according to claim 1, in which the binder comprises a reactive oligomer and a reactive diluent.

14. An article according to claim 13, in which the reactive diluent is a vinyl ester.

15. An article according to claim 13, in which the binder on curing substantially comprises microdispersed homopolymers of said reactive oligomer and of said reactive diluent.

16. An article according to claim 13, in which the binder as applied is comprised of 35–55% weight of said reactive oligomer and 65–45% of said reactive diluent.

17. An article according to claim 13, in which the reactive oligomer is an acrylated aromatic/aliphatic epoxy blend and the reactive diluent is vinyl ester of versatic acid.

18. An article according to claim 1, in which said colorant is folic acid.

19. An article according to claim 1, in which said colorant is basic copper carbonate.

20. An article according to claim 1, in which the initiator generates free radicals in the presence of UV radiation.

21. An article according to claim 1, in which the initiator generates cations in the presence of UV radiation.

22. An article according to claim 1, in which the thickness of the composition is less than 100 microns.

23. An article according to claim 22 in which the thickness of the composition is less than 10 microns.

24. An article according to claim 1, in which the substrate has the composition printed on a surface thereof.

25. An article according to claim 1, in which the color change is produced by heating the composition to a temperature below 300° C.

26. A method of rendering a recoverable substrate thermochromic, which comprises
    (1) printing on the substrate a temperature indicating composition comprising:
        (a) a UV curable binder which on curing is capable of adhering to the substrate;
        (b) a colorant which produces in the composition a substantial color change when the composition is heated; and
        (c) an initiator which on exposure to UV radiation initiates a polymerization reaction in the binder;
    (2) subjecting the composition to UV radiation to polymerize the binder.

* * * * *